June 30, 1942.  T. ULRICH  2,288,172

SOUND DEADENING CONNECTION

Filed Aug. 4, 1939

Inventor
Theodore Ulrich
By John P. Tarbox
Attorney

Patented June 30, 1942

2,288,172

UNITED STATES PATENT OFFICE 2,288,172

SOUND DEADENING CONNECTION

Theodore Ulrich, Detroit, Mich., assignor to Edward G. Budd Manufacturing Company, Philadelphia, Pa., a corporation of Pennsylvania Application August 4, 1939, Serial No. 288,274

5 Claims. (Cl. 248—54)

My present invention pertains to new and unusually simple means and method for attaching one noise or resonance producing unit to another. In the embodiment of my invention described herein the principle thereof is shown applied in attaching a noise or resonance producing unit of an automobile to the sheet metal floor panel or underbody of the automobile in such a manner that vibration absorbing or silencing effect is obtained. As will be developed hereafter, this result is accomplished without the use of special brackets, springs or other accessories.

I will now proceed to explain my invention by reference to the appended drawing in which.

Figure 1:
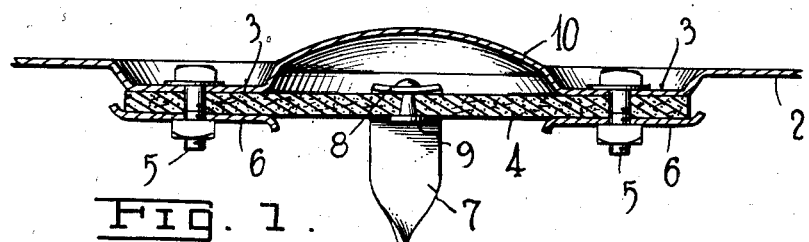
Fig. 1 is an elevational view in section of a portion of a floor showing my improved arrangement for supporting therefrom an engine exhaust pipe.

For various good reasons the present trend in development of automobile construction has been toward all-metal bodies. While this type of construction has very definite and well known advantages, it has also introduced new problems which did not exist in connection with the non-metallic or partially non-metallic automobile bodies of former years. Among such problems has been that of reducing, if not eliminating, various sources of noise originally more or less inherent in all-metal construction. Much has already been done to deaden many of the sources of noise in such construction, but the attachment of parts, such as the vibration producing engine exhaust pipe, to the all-metal body has heretofore not been satisfactorily accomplished. The present invention presents a very simple solution of this latter problem.

In the drawing the engine exhaust pipe is designated by the reference numeral 1. In order to attach this pipe to the lower side of the sheet metal plate 2 forming the floor panel or underbody of the car, two depressions 3 of suitable depth and shape are pressed as by die-stamping, into the metal of the panel, as shown, on the lower side of panel 2. These depressions appear as bosses, which according to the present invention are bridged by a flexible non-metallic member 4. This member may be constructed of a large variety of materials, the primary consideration being that the material selected shall be incapable of transmitting vibrations from the pipe 1 to the main body of the car. Member 4, therefore, will ordinarily not be made entirely of metal, but may be made for example of flexible material such as rubber, wood, webbing, fabric or laminated materials such as canvas, leather and the like, of suitable strength. Member 4 is shown firmly attached to bosses 3 by means of bolts 5 and clips 6.

For securing exhaust pipe 1 to member 4 intermediate of the attachment of the latter to bosses 3, clamping means 7 are provided suitably secured to the exhaust pipe and fastened by means of curved extension plate 8 to the member 4 by means of rivet 9.

In order to provide further clearance between the point of attachment of the curved plate 8 to member 4, and panel 2, a suitable cup or clearance depression 10 may be pressed or die-formed into plate 2 in the opposite direction to that in which bosses 3 were formed.

Figure 2:
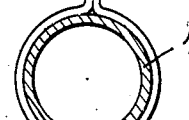
Fig. 2 is an inverted plan view looking upward at the structure shown in Fig. 1.
Figure 2:
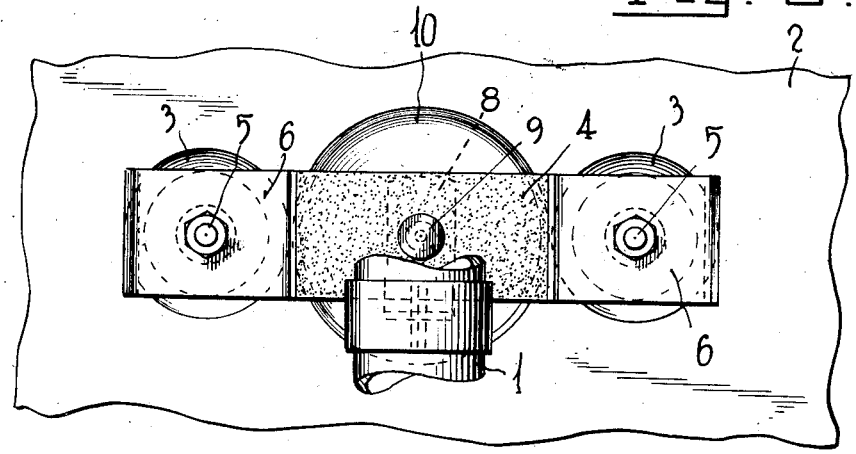
Figure 3:
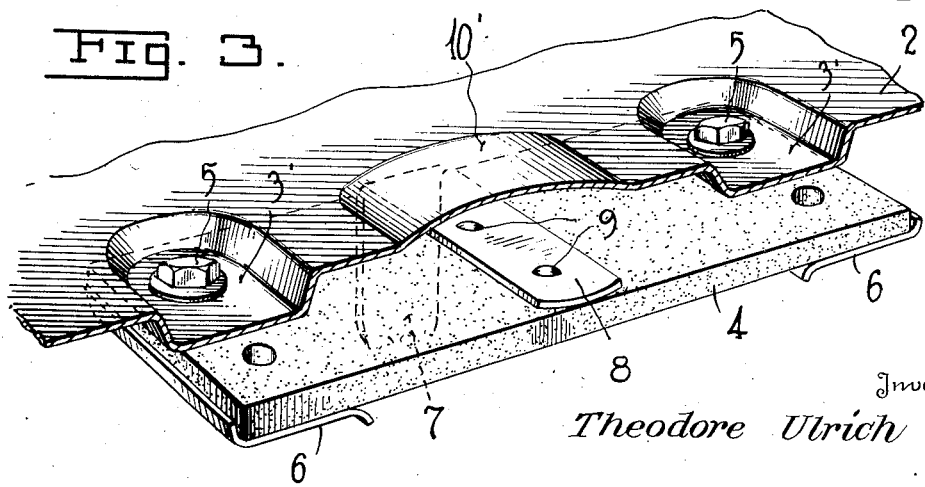
Fig. 3 is a perspective view, with certain portions broken away, of another embodiment of my invention.

In the embodiment of my invention illustrated in Fig. 3, elongated bosses 3' are formed in panel 2 in order to permit use of more than one attaching bolt 5 in each boss. Similarly a suitable elongated cup or depression 10' may be formed in panel 2 instead of the round cup shown in Figs. 1 and 2. In this embodiment also clamp 7 ber 4 by means of two rivets 9.

From the above description it will be readily apparent that I have provided an extremely simple attachment for connecting one noise or resonance producing unit to another. While the illustration of my invention has been by way of its application to the attachment of an engine exhaust pipe to the metal floor plate of an automobile, other applications will readily suggest themselves. For example, application of this invention may be made in the securing or supporting of a metal plate such as 2 upon another element in such a way as to prevent or reduce materially the transmission of either sound or other vibrations therebetween. In fact, it is conceivable that the entire car body may be supported upon the chassis by means of a suitable number of such flexible mountings.

It will thus be seen that effective silencing may be accomplished by the practice of my invention with a minimum number of separate parts (many of the essential elements being formed from the underbody panel itself as explained above) and at very slight cost. Other objects of my invention will be apparent from the present description thereof, and from the appended claims.

What I claim is:

1. Means for connecting a vehicle accessory such as the exhaust pipe to a panel such as the floor plate of the vehicle body, comprising spaced projections on one side of said panel, a member of non-resonant web-shaped material secured to and bridging said projections, and means secured to said member and to said accessory, said means being also secured to a narrow region of said member which region is situated about midway between said projections and the width of which is only a small fraction of the distance between said projections, whereby transmission of sound from said accessory to said panel is effectively suppressed.

2. Means for connecting a vehicle accessory such as the exhaust pipe to a panel such as the metal floor plate of the vehicle body, comprising spaced projections integrally formed as one piece with one side of said panel, a web of non-resonant material secured to and bridging said projections, and means secured to said accessory and to a narrow region of said web, which region is situated about midway between said projections and the width of which is only a small fraction of the distance between said projections, whereby the accessory is secured to said panel and transmission of sound from said accessory to said panel is effectively suppressed.

3. Means for connecting a metal plate with another noise or resonance producing element, comprising spaced portions projecting in one direction beyond the main plane of said plate, a member of non-resonant material secured to and bridging said projecting portions, means secured to said member and to said element to be connected with said plate, whereby transmission of sound between said plate and said element is effectively suppressed, and an offset portion in said plate adjacent the connection between said member and said element and projecting in the opposite direction as said first-named projecting portions beyond the main plane of said plate, to provide additional clearance between said plate and said member.

4. Means for connecting a vehicle accessory such as the exhaust pipe to a panel such as the metal floor plate of the vehicle body, comprising spaced projections on one side of said panel, a member of non-resonant material secured to and bridging said projections, means secured to said member and to said accessory, whereby the latter is secured to said member, and transmission of sound from said accessory to said panel is effectively suppressed, and an offset portion in said panel adjacent the connection between said member and said accessory and projecting in the opposite direction as said projections beyond the main plane of said panel, to provide additional clearance between said panel and said member.

5. Means for connecting a vehicle accessory such as the exhaust pipe to a panel such as the metal floor plate of the vehicle body, comprising spaced projections integrally formed as one piece with one side of said panel, a member of non-resonant material secured to and bridging said projections, means secured to said member and to said accessory, whereby the latter is secured to said member, and transmission of sound from said accessory to said panel is effectively suppressed, and an offset portion in said panel adjacent the connection between said member and said accessory and projecting in the opposite direction as said first-named projections beyond the main plane of said panel, to provide additional clearance between said panel and said member.

THEODORE ULRICH.